(12) United States Patent
Salter et al.

(10) Patent No.: US 12,304,429 B2
(45) Date of Patent: May 20, 2025

(54) VEHICLE SENSOR CONTROL FOR OPTIMIZED MONITORING

(71) Applicant: Ford Global Technologies, LLC, Dearborn, MI (US)

(72) Inventors: Stuart C. Salter, White Lake, MI (US); Brendan Francis Diamond, Grosse Pointe, MI (US); Hussein H. Berry, Dearborn, MI (US); John Robert Van Wiemeersch, Novi, MI (US); Timothy John Zuraw, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 17/570,636

(22) Filed: Jan. 7, 2022

(65) Prior Publication Data

US 2023/0219529 A1 Jul. 13, 2023

(51) Int. Cl.
*B60R 25/40* (2013.01)
*B60R 25/31* (2013.01)

(52) U.S. Cl.
CPC ............ *B60R 25/403* (2013.01); *B60R 25/31* (2013.01)

(58) Field of Classification Search
CPC ... B60R 25/403; B60R 25/31; B60R 25/2045; B60R 16/023; B60J 5/00
See application file for complete search history.

(56) References Cited

U.S. PATENT DOCUMENTS

| | | | |
|---|---|---|---|
| 5,049,867 A | 9/1991 | Stouffer | |
| 5,739,749 A * | 4/1998 | Hwang | B60R 25/04 340/426.3 |
| 7,081,813 B2 | 7/2006 | Winick et al. | |
| 11,055,936 B2 | 7/2021 | Warner et al. | |
| 2004/0135354 A1 * | 7/2004 | Kishimoto | B60R 21/01566 180/272 |
| 2006/0250501 A1 * | 11/2006 | Widmann | G08B 13/19695 348/148 |
| 2012/0287031 A1 * | 11/2012 | Valko | G09G 5/00 345/156 |
| 2015/0348417 A1 * | 12/2015 | Ignaczak | G08G 1/165 340/435 |
| 2017/0101110 A1 * | 4/2017 | Yoo | B60W 10/20 |
| 2017/0136989 A1 * | 5/2017 | Haber | B60R 25/1004 |
| 2017/0241184 A1 * | 8/2017 | Rust | E05F 15/73 |
| 2017/0369016 A1 * | 12/2017 | Gurghian | B60W 50/14 |
| 2020/0074852 A1 * | 3/2020 | Hu | G01S 13/867 |
| 2020/0142499 A1 * | 5/2020 | Katz | G06F 3/013 |
| 2021/0182573 A1 * | 6/2021 | Sabeti | G06V 20/58 |
| 2021/0287017 A1 | 9/2021 | Turk | |
| 2023/0227003 A1 * | 7/2023 | Herman | B60R 25/245 340/5.72 |
| 2024/0121509 A1 * | 4/2024 | Manabe | H04N 23/661 |

* cited by examiner

*Primary Examiner* — Anshul Sood
(74) *Attorney, Agent, or Firm* — Frank Lollo; Brooks Kushman P.C.

(57) ABSTRACT

Upon detecting a user departing a passenger cabin of a vehicle, a pose of the user is determined relative to the vehicle. A classification for a vehicle door is determined based on the pose. The classification is one of monitored or unmonitored. A sensor is controlled to monitor the vehicle door based on the classification.

19 Claims, 8 Drawing Sheets

VEHICLE SENSOR CONTROL FOR OPTIMIZED MONITORING

BACKGROUND

Vehicles can use a battery and an internal combustion engine to power vehicle components, including, e.g., a powertrain, a steering rack, etc., during vehicle operation. For example, sensors that collect data while operating, including radar, LIDAR, vision systems, infrared systems, and ultrasonic transducers, consume energy from the battery. When the vehicle is deactivated, one or more components can remain activated, drawing power from the battery that may then be unavailable to reactivate the vehicle.

DETAILED DESCRIPTION

Figure 1:
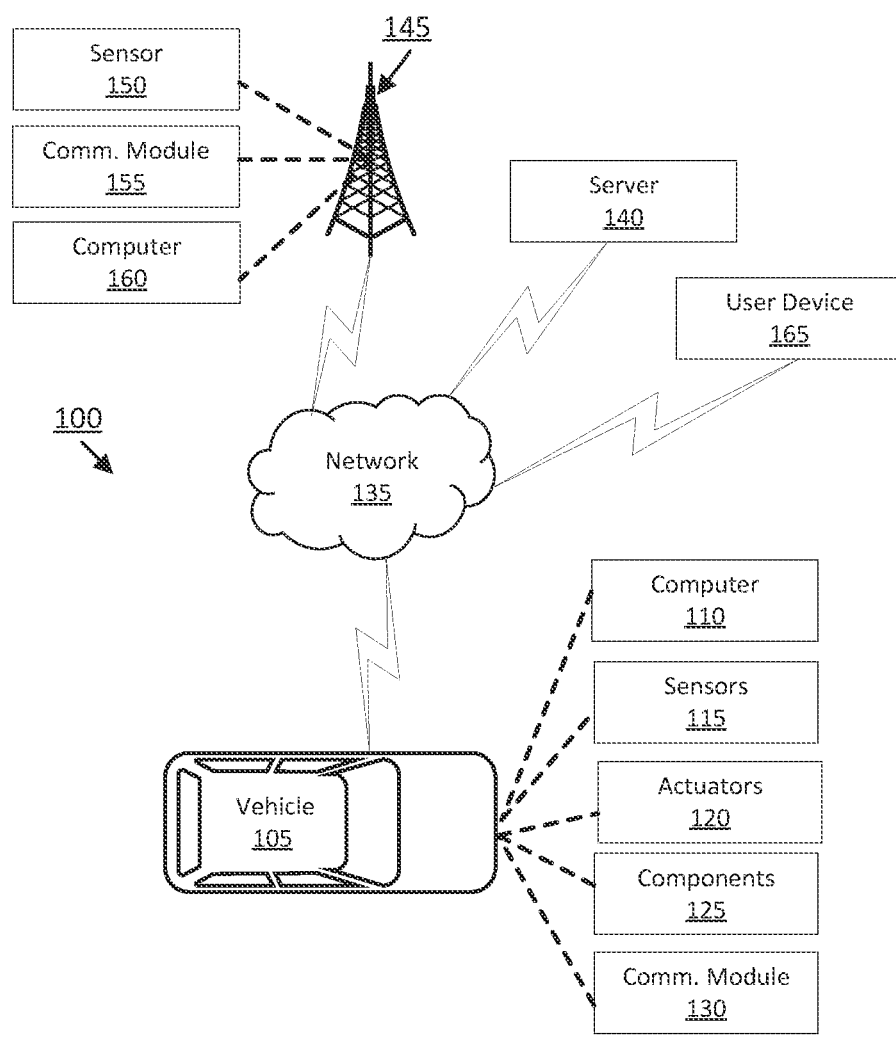
FIG. 1 is a block diagram illustrating an example vehicle control system for a vehicle.

Advantageously, as described herein, a vehicle computer can efficiently monitor vehicle doors. Leaving a vehicle in an ON state allows one or more sensors to draw power from a battery to monitor the vehicle doors, which can increase power consumption from the battery, thereby preventing the battery from having a sufficient state of charge to power other vehicle components. Leaving the vehicle in an OFF state reduces power consumption by the sensor(s) by preventing the sensor(s) from drawing power from the battery. However, when the vehicle is in the OFF state, the sensor(s) are unable to monitor the vehicle doors.

To provide efficient monitoring, a vehicle computer can classify a vehicle door upon determining a pose of a user outside of a passenger cabin. The vehicle computer can then activate a sensor to monitor the vehicle door based on the classification. Selectively activating the sensor to monitor the vehicle door can prevent or reduce power consumption by the sensor, thereby reducing power consumed from the battery.

A system, comprising a computer including a processor and a memory, the memory storing instructions executable by the processor programmed to, upon detecting a user departing a passenger cabin of a vehicle, determine a pose of the user. The instructions further include instructions to determine a classification for a vehicle door based on the pose. The classification is one of monitored or unmonitored. The instructions further include instructions to control a sensor to monitor the vehicle door based on the classification.

The instructions can further include instructions to classify the vehicle door as unmonitored based additionally on determining the user departed the passenger cabin through another vehicle door.

The instructions can further include instructions to classify the vehicle door as unmonitored based on determining the user is facing in a direction away from the vehicle door.

The instructions can further include instructions to activate the sensor to monitor the vehicle door based on determining the vehicle door is unmonitored.

The instructions can further include instructions to classify the vehicle door as monitored based on determining a distance from the user to the vehicle door is less than or equal to a threshold distance.

The instructions can further include instructions to prevent activation of the sensor based on the distance remaining less than or equal to the threshold distance.

The instructions can further include instructions to activate the sensor based on the distance increasing above the threshold distance.

The instructions can further include instructions to deactivate the sensor based on the distance decreasing below the threshold distance.

The instructions can further include instructions to, upon classifying the vehicle door as monitored, prevent activation of the sensor prior to expiration of a timer.

The instructions can further include instructions to initiate the timer upon detecting the user departing from the passenger cabin.

The instructions can further include instructions to activate the sensor upon expiration of the timer.

The instructions can further include instructions to classify of the vehicle door as monitored based additionally on determining the user departed the passenger cabin through the vehicle door.

The instructions can further include instructions to classify the vehicle door as monitored based on determining the user is facing in a direction towards from the vehicle door.

The instructions can further include instructions to control the sensor to monitor the vehicle door based additionally on a field of view of an infrastructure sensor.

The instructions can further include instructions to prevent activation of the sensor upon determining that the vehicle door is within the field of view of the infrastructure sensor.

The instructions can further include instructions to activate the sensor upon determining that the vehicle door is outside of the field of view of the infrastructure sensor and is classified as unmonitored.

The instructions can further include instructions to control the sensor to monitor the vehicle door based additionally on a location of the vehicle.

The instructions can further include instructions to control the sensor to monitor the vehicle door based additionally on a time of day.

A method includes, upon detecting a user departing a passenger cabin of a vehicle, determining a pose of the user. The method further includes determining a classification for a vehicle door based on the pose. The classification is one of monitored or unmonitored. The method further includes controlling a sensor to monitor the vehicle door based on the classification.

The method can further include controlling the sensor to monitor the vehicle door based additionally on at least one of a location of the vehicle or a time of day.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-5, an example vehicle control system 100 includes a vehicle 105. A vehicle computer 110 in the vehicle 105 receives data from sensors 115, including a first sensor 115a and a second sensor 115b. The vehicle computer 110 is programmed to, upon detecting a user departing a passenger cabin 300 of the vehicle 105, determine a pose of the user. The vehicle computer 110 is further programmed to determine a classification for a vehicle door 305 based on the pose. The classification is one of monitored or unmonitored. The vehicle computer 110 is further programmed to control a sensor 115 to monitor the vehicle door 305 based on the classification.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 165, and/or other vehicles, e.g., via a messaging or broadcast protocol such as Dedicated Short Range Communications (DSRC), cellular, IEEE 802.11, Bluetooth®, Ultra-Wideband (UWB), and/or other protocol that can support vehicle-to-vehicle, vehicle-to-infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC (application specific integrated circuit) that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, UWB, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, UWB, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

An infrastructure element 145 includes a physical structure such as a tower, pole, etc., on or in which infrastructure sensors 150, as well as an infrastructure communications module 155 and computer 160 can be housed, mounted, stored, and/or contained, and powered, etc. One infrastructure element 145 is shown in FIG. 1 for ease of illustration, but the system 100 could include a plurality of infrastructure elements 145.

An infrastructure element 145 is typically stationary, i.e., fixed to and not able to move from a specific physical location. The infrastructure sensors 150 may include one or more sensors such as described above for the vehicle 105 sensors 115, e.g., LIDAR, radar, cameras, ultrasonic sensors, etc. The infrastructure sensors 150 are fixed or stationary. That is, each infrastructure sensor 150 is mounted to the infrastructure element 145 so as to have a substantially unmoving and unchanging field of view.

Infrastructure sensors 150 thus provide field of views that can differ from fields of view of vehicle 105 sensors 115 in several respects. First, because infrastructure sensors 150 typically have a substantially constant field of view, determinations of vehicle 105 and object locations typically can be accomplished with fewer and simpler processing resources than if movement of the infrastructure sensors 150 also had to be accounted for. Further, the infrastructure sensors 150 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, infrastructure sensors 150 typically can communicate with the computer 160 via a wired connection, whereas vehicles 105 typically can communicate with infrastructure elements 145 only wirelessly, or only at very limited times when a wired connection is available. Wired communications are typically more reliable and can be faster than wireless communications such as vehicle-to-infrastructure communications or the like.

The infrastructure communications module 155 and computer 160 typically have features in common with the vehicle computer 110 and vehicle communications module 130, and therefore will not be described further to avoid redundancy. Although not shown for ease of illustration, the infrastructure element 145 also includes a power source such as a battery, solar power cells, and/or a connection to a power grid.

The user device 165 can be a conventional computing device, i.e., including one or more processors and one or more memories, programmed to provide operations such as disclosed herein. The user device 165 can be a portable device. A portable device can be any one of a variety of computers that can be used while carried by a person, e.g., a smartphone, a tablet, a personal digital assistant, a smart watch, a key fob, etc. Further, the user device 165 can be accessed via the network 135, e.g., the Internet, a cellular network, and/or or some other wide area network.

Figure 2:
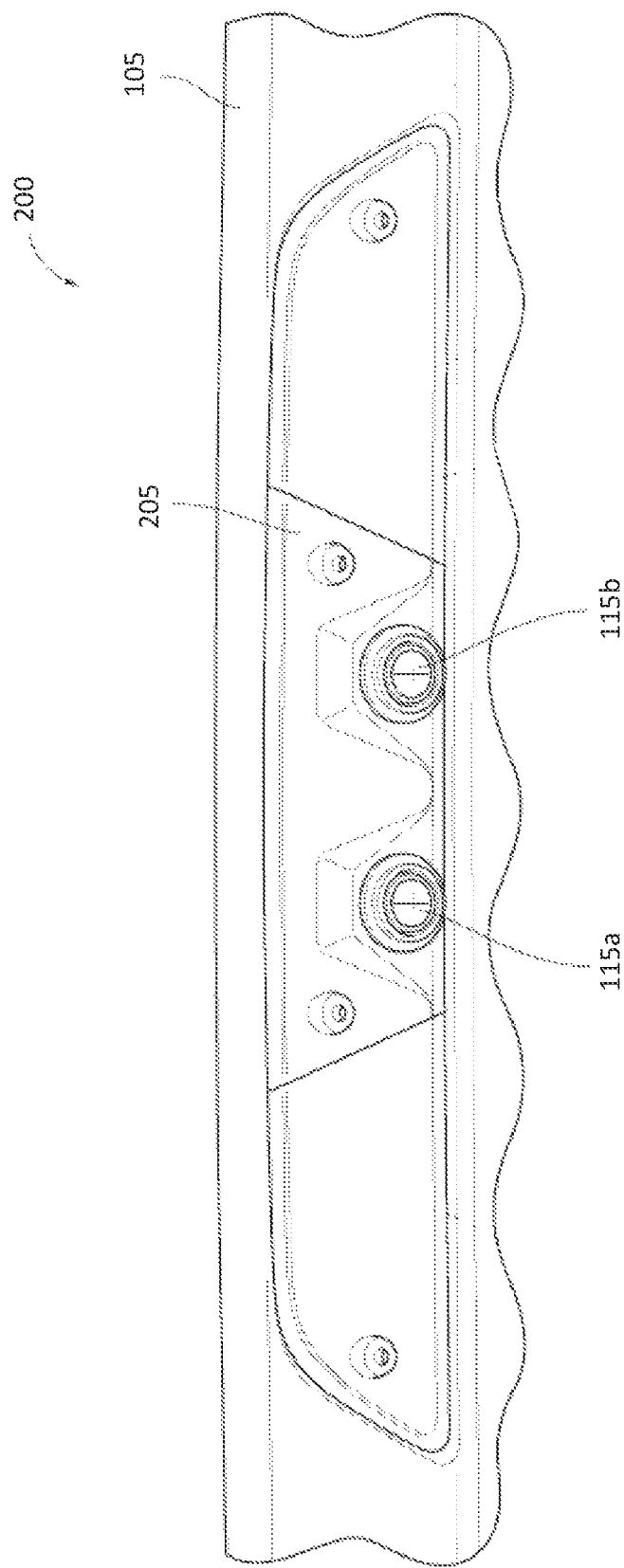
FIG. 2 is a plan view of a sensor assembly including first and second sensors.
Figure 3:
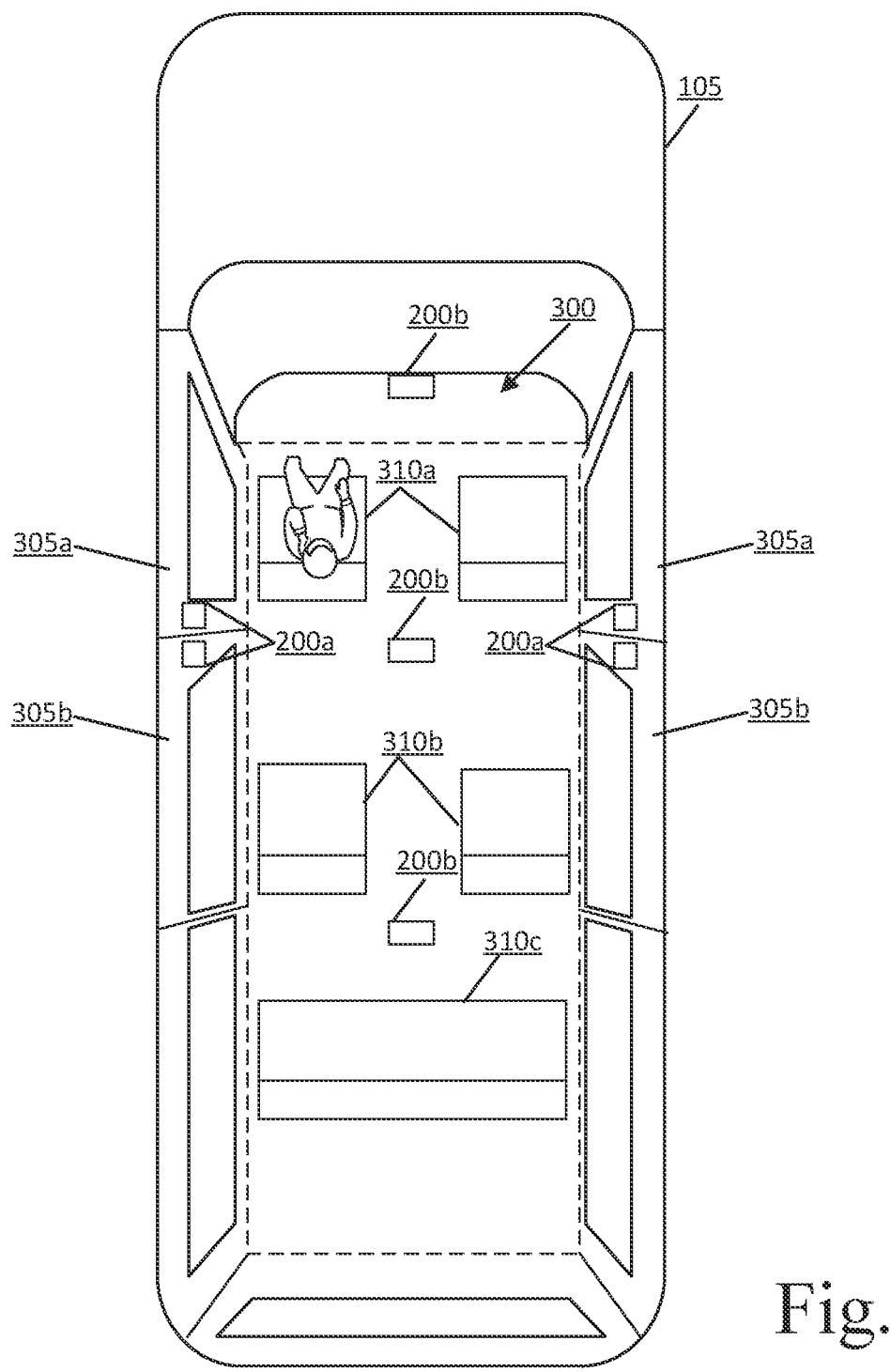
FIG. 3 is a diagram illustrating an exemplary passenger cabin of the vehicle.
Figure 4A:
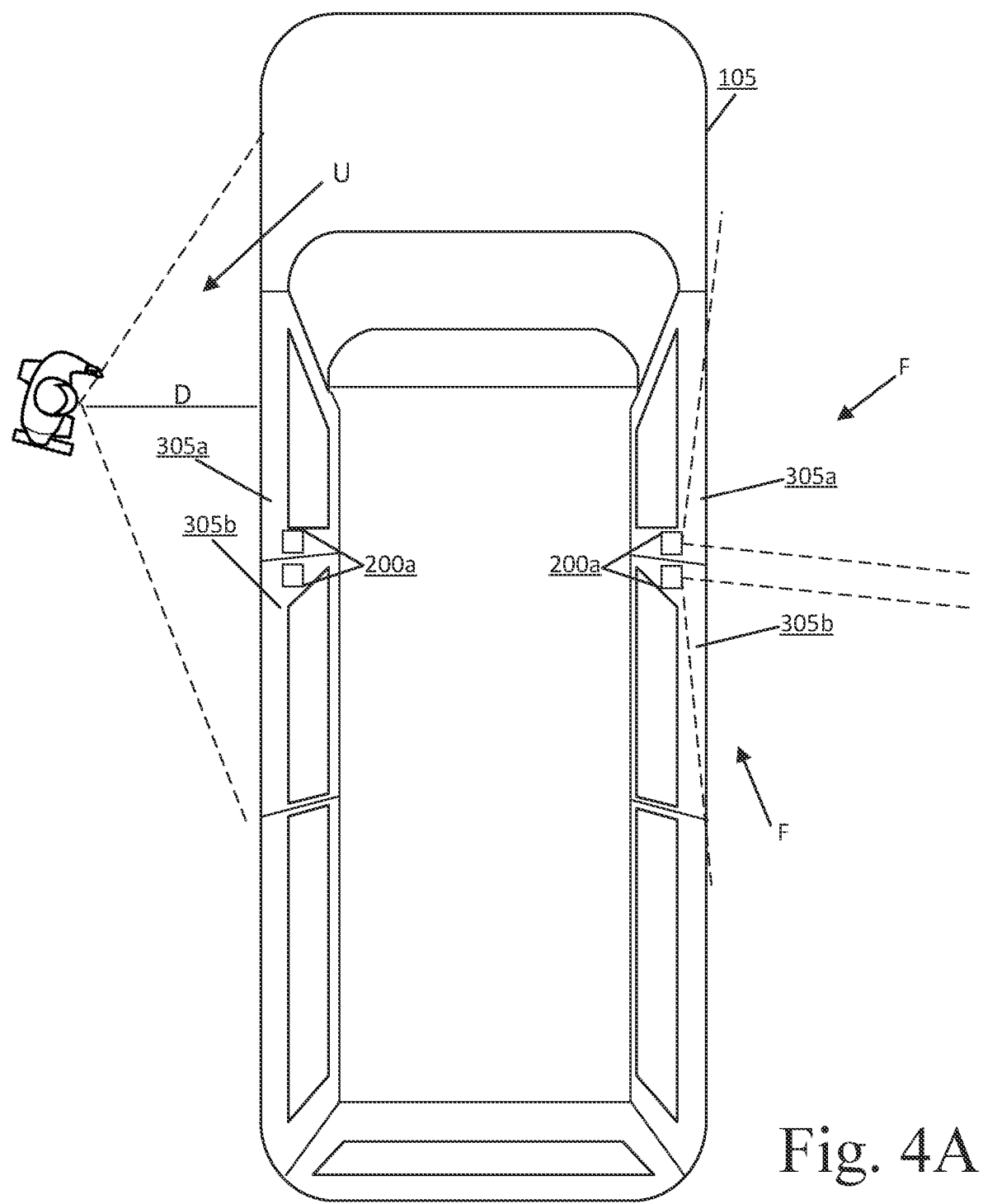
FIGS. 4A-4B are diagrams illustrating exemplary poses for a user outside the passenger cabin.
Figure 4B:
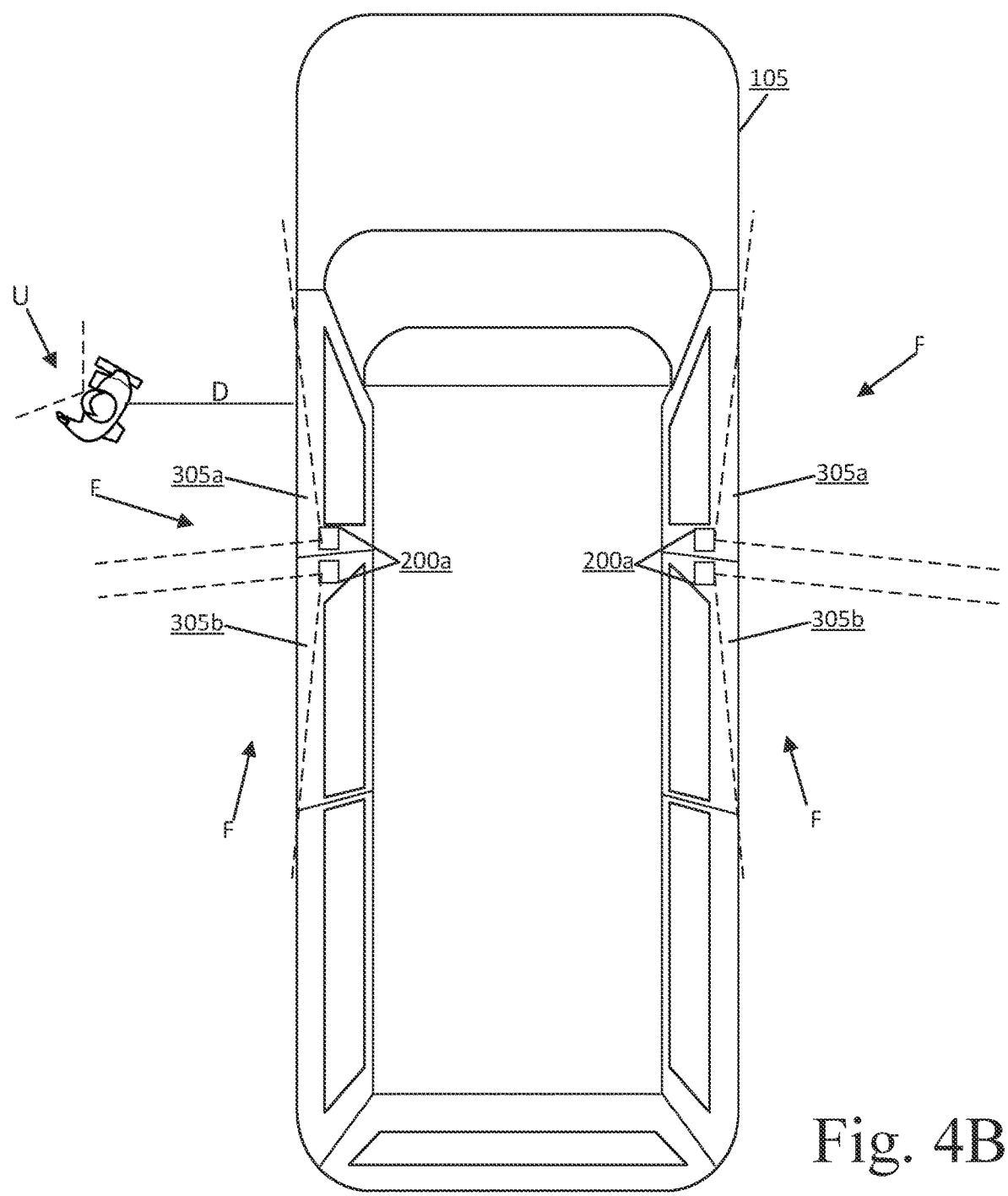
Figure 5:
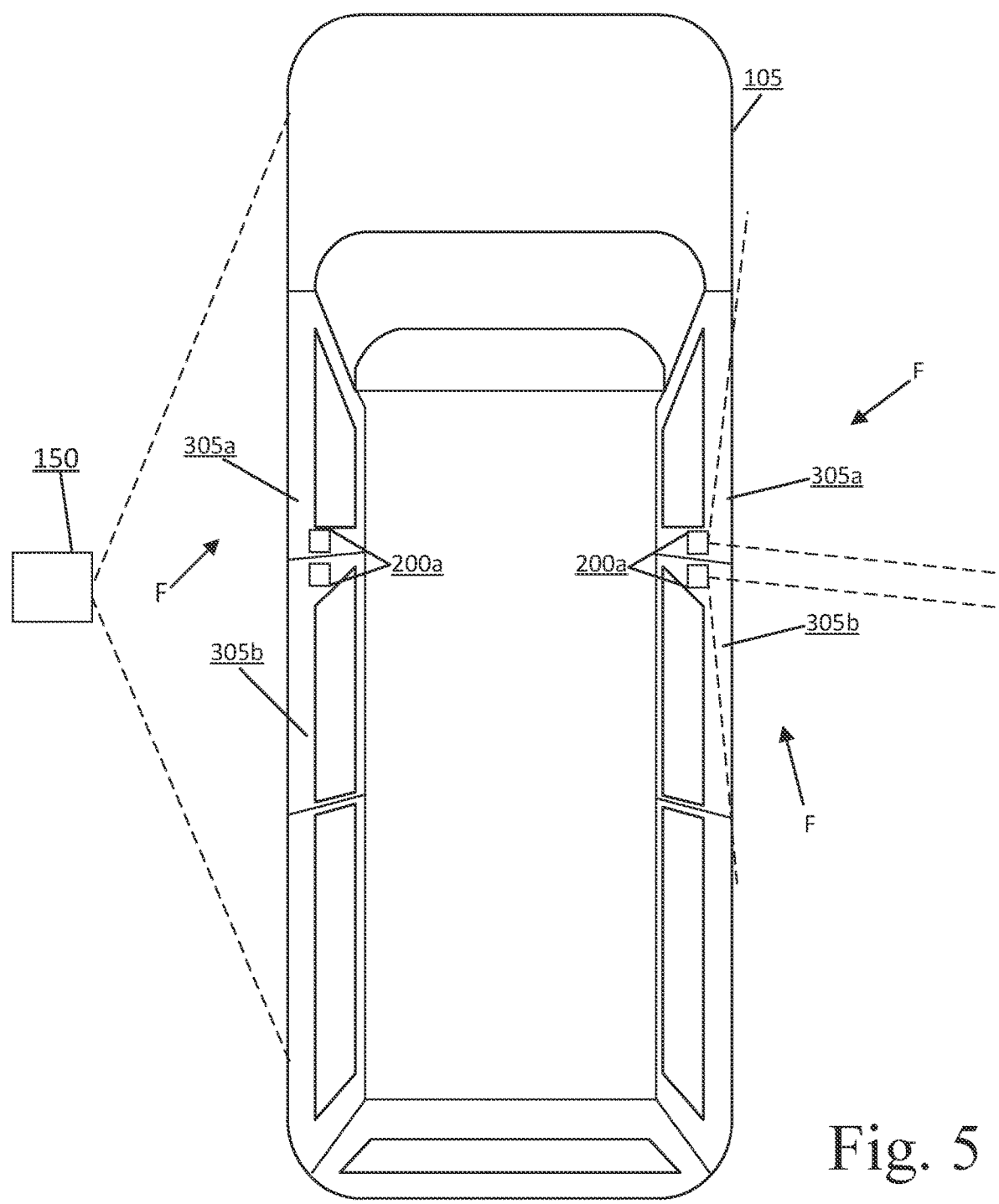
FIG. 5 is a diagram illustrating an exemplary infrastructure sensor having a field of view including the exemplary vehicle.

Turning now to FIG. 2, the vehicle 105 may include one or more sensors 115 and one or more sensor assemblies 200 in which sensors 115 can be mounted, such as the illustrated sensor assembly 200. The sensor assembly 200 includes a housing 205, a first sensor 115a, and a second sensor 115b. The housing 205 may be mounted, e.g., via fasteners, welding, adhesive, etc., to the vehicle 105. As illustrated in FIG. 3, the vehicle 105 may include a plurality of sensor assemblies 200 that are positioned to monitor an environment around the vehicle 105, i.e., external sensor assemblies 200a, and a plurality of sensor assemblies 200 that are positioned to monitor a passenger cabin 300 of the vehicle 105, i.e., internal sensor assemblies 200b.

The housing 205 retains the first sensor 115a and the second sensor 115b. The first sensor 115a in the present example is a type suitable for detecting objects, e.g., in an environment around the vehicle 105. In particular, the first sensor 115a can be a radar. A radar, as is known, uses radio waves to determine the relative location, angle, and/or velocity of an object by tracking the time required for the radio waves generated by the radar to reflect back to the radar. Alternatively, the first sensor 115a can be an ultrasonic sensor, a UWB transceiver, or any other suitable type of sensor. The first sensor 115a runs at a scanning rate, which is an occurrence interval of generating and transmitting the radio waves, e.g., twice per second, once every two seconds, etc. The power draw, i.e., the rate of power consumption, of the first sensor 115a depends on the scanning rate, i.e., typically is higher for higher scanning rates.

The second sensor 115b in the present example is a type suitable for providing data about the environment around the vehicle 105. For example, the second sensor 115b can be a camera. A camera, as is known, detects electromagnetic radiation in some range of wavelengths. For example, the camera may detect visible light, infrared radiation, ultraviolet light, or some range of wavelengths including visible, infrared, and/or ultraviolet light. The power draw of the second sensor 115b in the present example is higher than the power draw of the first sensor 115a for any scanning rate of the first sensor 115a. Alternatively, the second sensor 115b can be an ultrasonic sensor, a UWB transceiver, or any other suitable type of sensor.

The first sensor 115a and the second sensor 115b can be arranged in the housing 205 so that respective fields of view of the first sensor 115a and the second sensor 115b at least partially overlap. For example, fields of view of the first and second sensors 115a, 115b may be identical. The fields of view of the first and second sensors 115a, 115b include an area or, more typically, a three-dimensional space, i.e., a volume, around the vehicle 105. For example, the first and second sensors 115a, 115b can be mounted into a fixed position relative to the housing 205. The first and second sensors 115a, 115b can face in generally a same direction relative to the vehicle 105.

FIG. 3 is a diagram of a top view of an example passenger cabin 300 of an example vehicle 105. The vehicle 105 may include a body (not numbered) defining the passenger cabin 300 to house users, if any, of the vehicle. The body includes doors 305 and windows openable to allow ingress and egress from the passenger cabin 300.

The passenger cabin 300 may extend across the vehicle 105, i.e., from one side to the other side of the vehicle 105. The passenger cabin 300 includes a front end (not numbered) and a rear end (not numbered) with the front end being in front of the rear end during forward movement of the vehicle 105. The passenger cabin 300 includes one or more seats 310. The seats 310 may be arranged in any suitable arrangement. For example, the passenger cabin 300 may include one or more front seats 310a disposed at a front of the passenger cabin 300 and one or more back seats 310b disposed behind the front seats 310a. The passenger cabin 300 may also include third-row seats 310c at the rear of the passenger cabin 300. In FIG. 3, the front seats 310a and back seats 310b are shown to be bucket seats and the third-row seats 310c are shown to be bench seats, but the seats 310 may be other types. In FIG. 3, the front seats 310a are disposed adjacent to respective front doors 305a, and the back seats 310b are disposed adjacent to respective rear doors 305b.

The vehicle computer 110 may be programmed to determine whether a door 305 is opened or closed based on sensor 115 data. For example, the vehicle 105 may include one door sensor 115 positioned adjacent to each door 305. The door sensor 115 may be a button positioned where the door 305, if closed, will press the button. As another example, the door sensor 115 may be a switch on a latch that is positioned to engage a striker when the door 305 is closed. As another example, the door sensor 115 may be a sensor, e.g., a voltmeter, ammeter, ohmmeter, etc., that registers a value of an electrical variable, e.g., voltage, current, resistance, etc., in an electrical circuit that includes circuit elements in the door 305. Values of the electrical variable corresponding to an open circuit may be classified as the door 305 being open, and values of the electrical variable corresponding to a closed circuit may be classified as the door 305 being closed.

The vehicle computer 110 may be programmed to determine a seat 310 in which a user is seated. For example, the vehicle 105 may include a seat occupancy sensor 115 for each seat 310. The seat occupancy sensor 115 may be programmed to detect occupancy of the seat 310. The seat occupancy sensor 115 may, for example, be a post-contact sensor, such as pressure sensors and contact switches. As another example, the seat occupancy sensor 115 may be a sensor, e.g., a voltmeter, ammeter, ohmmeter, etc., that registers a value of an electrical variable, e.g., voltage, current, resistance, etc., in an electrical circuit that includes circuit elements in the seat 310. Values of the electrical variable corresponding to an open circuit may be classified as the seat 310 being unoccupied, and values of the electrical variable corresponding to a closed circuit may be classified as the seat 310 being occupied.

The vehicle computer 110 is programmed to manage startup and shutdown of the vehicle 105. That is, the vehicle computer 110 can transition the vehicle 105 between activation states. For example, the vehicle computer 110 can transition the vehicle 105 between activation states based on receiving a request from, e.g., the remote server computer 140, the user device 165, user input to a power button in a passenger cabin 300 of the vehicle 105, etc. In this context, an "activation state" specifies a power state of vehicle components 125 and sensors 115, i.e., whether, and/or an amount that, a component 125 and/or sensor 115 is electrically powered during startup and/or shutdown of the vehicle 105, e.g., unpowered, powered with a specific power supply, etc.

The activation state can be one of an OFF state, a minimal power state, and an ON state. In the ON state, all vehicle components 125 and sensors 115 are available to be actuated by the vehicle computer 110 to operate the vehicle 105. In the OFF state, the vehicle components 125 and sensors 115 are substantially powered off to conserve energy when the vehicle 105 is not in use. In the minimal power state, vehicle components 125 and/or sensors 115 may draw power from a power supply for less than all operation when the vehicle 105 is in the ON state. That is, the vehicle components 125 and/or sensors 115 draw power for a specific, limited set of operations, e.g., monitoring the environment around the vehicle 105.

The power supply provides electricity to one or more components 125 and sensors 115. The power supply can include one or more batteries, e.g., 12-volt lithium-ion batteries, and one or more power networks to supply power from the batteries to the components 125 and sensors 115. In the ON state, the power supply provides power to all of the vehicle components 125 and sensors 115. In the minimal power state, the power supply may provide power to a subset, i.e., some but less than all, of the vehicle components 125 and sensors 115. For example, the power supply may provide power to the sensors 115 but not to the vehicle components 125. In the OFF state, the power supply does not provide power to the vehicle components 125 or sensors 115. The vehicle computer 110 can receive power from the power supply regardless of the activation state. The vehicle computer 110 can actuate the power supply based on the activation state.

The vehicle computer 110 can detect a user in the passenger cabin 300 based on sensor 115 data when the vehicle 105 is in the ON state. For example, the vehicle computer 110 can receive sensor 115 data from the seat occupancy sensor 115 indicating a presence of a user in a seat 310, as discussed above. Additionally, or alternatively, the vehicle computer 110 can receive sensor 115 data, e.g., image data, from a sensor 115 positioned to face the passenger cabin 300, e.g., a second sensor 115b of an internal sensor assembly 200b. The sensor 115 data can include one or more objects in the passenger cabin 300. The vehicle computer 110 can identify the user from the sensor 115 data. For example, object identification techniques can be used, e.g., in the vehicle computer 110 based on LIDAR sensor 115 data, camera sensor 115 data, etc., to identify a type of object 605, e.g., a user, a user device 165, a purse, a wallet, etc., as well as physical features of objects 605.

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification of a user or an indication that no user is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the vehicle computer 110 could employ various techniques for fusing (i.e., incorporating into a common coordinate system or frame of reference) data from different sensors 115 and/or types of sensors 115, e.g., LIDAR, radar, and/or optical camera data.

Additionally, or alternatively, the vehicle computer 110 can detect the user in the passenger cabin 300 based on detecting, in the passenger cabin 300, a user device 165 associated with the user. For example, the vehicle computer 110 may be programmed to transmit, e.g., via a short-range broadcast protocol, a radio frequency (RF) signal, e.g., BLE, Ultra-Wideband (UWB), etc. The vehicle computer 110 can then detect the user device 165 based on detecting either the return of the respective transmitted RF signal or a response RF signal transmitted from the user device 165, e.g., continuously or in response to detecting the RF signal transmitted by the vehicle computer 110. Upon detecting the user device 165 the vehicle computer 110 can request location data from the user device 165. The user device 165 can transmit, e.g., via the network 135, location data, e.g., geo-coordinates, of the user device 165 to the vehicle computer 110. Upon receiving the location data of the user device 165, the vehicle computer 110 can compare the location data to a GPS-based geo-fence. A geo-fence herein has the conventional meaning of a boundary for an area defined by sets of geo-coordinates. In such an example, the geo-fence specifies a perimeter of the passenger cabin 300. The vehicle computer 110 can then determine that the user is within the passenger cabin 300 based on the location data of the user device 165 indicating the user device 165 is within the geo-fence.

The vehicle computer 110 may be programmed to associate a user in the passenger cabin 300 with a door 305. For example, upon determining a seat 310 in which the user is seated, e.g., based on sensor 115 data (as discussed above), the vehicle computer 110 can associate the user with the door 305 that is adjacent to the seat 310 in which the user is seated. For example, when the user is seated in a front left seat 310a (e.g., a driver's seat), the vehicle computer 110 can associate the user with a front left door 305a (e.g., a driver's door). The vehicle computer 110 can store the association, e.g., in a memory of the vehicle computer 110.

Upon receiving a request from, e.g., the remote server computer 140, the user device 165, user input to a power button in a passenger cabin 300 of the vehicle 105, etc., the vehicle computer 110 may be programmed to transition the vehicle 105 from the ON state to one of the OFF state or the minimal power state based on a time of day. For example, the vehicle computer 110 can receive and/or store a time period for monitoring the vehicle 105, e.g., via a user input to a human-machine interface (HMI), from a user device via the network 135, etc. The vehicle computer 110 may maintain a clock and can compare a current time to the received and/or stored time period. If the current time is within the time period, then the vehicle computer 110 can transition the vehicle 105 to the minimal power state in response to the request. If the current time is outside of the time period, then the vehicle computer 110 can transition the vehicle 105 to the OFF state in response to the request. That is, the vehicle computer 110 may transition the vehicle 105 to the minimal power state during a specified time period.

Additionally, or alternatively, upon receiving the request, the vehicle computer 110 may be programmed to transition the vehicle 105 to one of the OFF state of the minimal power state based on a location of the vehicle 105. For example, the vehicle computer 110 can receive and/or store a specified location for monitoring the vehicle 105, e.g., via a user input to the HMI, from the user device 165 via the network 135, etc. The vehicle computer 110 can receive location data for the vehicle 105, e.g., from one or more sensors 115, as discussed above. The vehicle computer 110 can then compare the location data to the specified location. If the location data for the vehicle 105 corresponds to the specified location, i.e., is within a specified distance from the specified location, then the vehicle computer 110 can transition the vehicle 105 to the minimal power state in response to the request. If the location data for the vehicle 105 does not correspond to the specified location, i.e., is outside the specified distance from the specified location, then the vehicle computer 110 can transition the vehicle 105 to the OFF state in response to the request. That is, the vehicle computer 110 may transition the vehicle 105 to the minimal power state when the vehicle 105 is at a specified location.

The vehicle computer 110 is programmed to classify each door 305 as one of monitored or unmonitored when the vehicle 105 is in the minimal power state. A "monitored" door is a door 305 that is within a field of view of a user and/or within a distance threshold from the user. An "unmonitored" door is a door 305 that is outside of a field of view of the user and/or outside of the distance threshold from the user.

To classify the doors 305, the vehicle computer 110 is programmed to determine the user has departed, i.e., egressed from, the passenger cabin 300. The vehicle computer 110 can determine that the user has departed the passenger cabin 300 based on sensor 115 data. For example, the vehicle computer 110 can receive image data from a second sensor 115*b* of an internal sensor assembly 200*b*, as discussed above. The vehicle computer 110 can determine an absence of the user in the passenger cabin 300, e.g., in the same manner as discussed above regarding determining a presence of the user in the passenger cabin 300. Additionally, or alternatively, the vehicle computer 110 can receive data from a door sensor 115 indicating that a door 305 associated with the user has been opened and then closed. Additionally, or alternatively, the vehicle computer 110 can receive data from a seat occupancy sensor 115 indicating that a seat 310 in which the user was seated is no longer occupied.

Additionally, or alternatively, the vehicle computer 110 can determine that the user has departed the passenger cabin 300 based on detecting the user device 165 outside of the passenger cabin 300. As one example, the vehicle computer 110 can detect the user device 165 and receive location data from the user device 165, e.g., as discussed above. The vehicle computer 110 can determine that the user is outside the passenger cabin 300 based on the location data of the user device 165 indicating that the user device 165 is outside the geo-fence specifying the perimeter of the passenger cabin 300.

Upon determining that the user has departed the passenger cabin 300, the vehicle computer 110 determines a pose of the user outside the passenger cabin 300. The pose of the user may be specified in six degrees-of-freedom. Six degrees-of-freedom conventionally, and in this document, refers to freedom of movement of an object in three-dimensional space, e.g., translation along three perpendicular axes and rotation about each of the three perpendicular axes. A six degree-of-freedom pose of the user means a location relative to a coordinate system (e.g., a set of coordinates specifying a position in the coordinate system, e.g., X, Y, and Z coordinates) and an orientation (e.g., a yaw, a pitch, and a roll) about each axis in the coordinate system. The pose of the user can be determined in real world coordinates based on orthogonal x, y, and z axes and roll, pitch, and yaw rotations about the x, y, and z axes, respectively. The pose of the user locates the user with respect to the real world coordinates.

As one example, the vehicle computer 110 can determine the pose based on the user device 165. For example, the user device 165 can provide location data for the user device 165, as discussed above, and an orientation for the user device 165 to the vehicle computer 110. The user device 165 can determine the orientation of the user device 165 based on sensor data from the user device 165, e.g., according to known techniques, e.g., using a magnetometer or the like. The vehicle computer 110 can then determine that the pose of the user corresponds to the received location and orientation of the user device 165.

Additionally, or alternatively, the vehicle computer 110 can determine the pose of the user based on sensor 115 data. For example, the vehicle computer 110 can activate a second sensor 115*b* of an external sensor assembly 200*b* mounted to the vehicle 105 and facing, i.e., having a field of view F including, the door 305 associated with the user. The field of view F has exemplary edges shown by dotted lines in the Figures.

The vehicle computer 110 can receive data, e.g., image data, from the second sensor 115*b* including the user. The vehicle computer 110 can then analyze the data from the second sensor 115*b*, e.g., according to known image processing techniques, to determine an intermediate pose of the user relative to the vehicle 105. The vehicle computer 110 can then combine a pose of the vehicle 105 and the intermediate pose of the user, e.g., using known data processing techniques, to determine the pose of the user. That is, the vehicle computer 110 can determine the intermediate pose of the user in local coordinates, i.e., a Cartesian coordinate system having an origin on the vehicle 105, and can then transform the local coordinates into real-world coordinates to determine the pose of the user, e.g., according to known geometric transformation techniques. The vehicle computer 110 can determine the pose of the vehicle 105 according to known techniques, e.g., based on receiving location data, e.g., GPS coordinates, of the vehicle 105, as discussed above, and determining an orientation for the vehicle 105, e.g., in a same manner as discussed above regarding determining the orientation for the user device 165. Upon determining the pose of the user, the vehicle computer 110 can deactivate the second sensor 115*b* facing the user.

Upon determining the pose of the user, the vehicle computer 110 is programmed to classify each door 305 based on the pose of the user. As one example, the vehicle computer 110 can classify a door 305 as monitored based on determining that the user is facing the door 305 (see FIG. 4A). Conversely, vehicle computer 110 can classify a door 305 as unmonitored based on determining that the user is not facing the door 305 (see FIG. 4B). The vehicle computer 110 can determine whether the user is facing a door 305 based on the orientation of the user. For example, the vehicle computer 110 can determine a user field of view U such that the user field of view U extends from the location of the user and is centered relative to the orientation of the user. The field of view U has exemplary edges shown by dotted lines in the Figures. The user field of view U can be determined empirically, e.g., based on testing that allows for determining an average field of view for various users (e.g., via physical measurements and/or computer-generated models representing various users). The user field of view U can be stored, e.g., in a memory of the vehicle computer 110. As another example, the vehicle computer 110 can determine the user field of view U based on image data from the second sensor 115*b* including the user, e.g., according to known image processing techniques, such as facial recognition techniques for determining respective fields of view for each eye of a user. As yet another example, the vehicle computer 110 can determine the user field of view U based on receiving a user input, e.g., via the HMI, specifying the user field of view U.

Additionally, the vehicle computer 110 can determine a location of a door 305. The vehicle computer 110 can store, e.g., in a memory, locations of the respective doors 305 relative to the vehicle computer 110, e.g., specified in local coordinates. The locations of the respective doors 305 relative to the vehicle computer 110 can be determined via physical measurements. The vehicle computer 110 can then then determine a real-world location of a door 305 by transforming the local coordinates of the door 305 into real-world coordinates via the pose of the vehicle 105, e.g., according to known geometric transformation techniques.

Upon determining the location of the door 305, the vehicle computer 110 can compare the location of the door 305 to the user field of view U. The vehicle computer 110 can determine that the user is facing the door 305 when the orientation of the user is in a direction from the user towards the door 305, i.e., when a user field of view U includes the door 305 (see FIG. 4A). Conversely, the vehicle computer 110 can determine that the user is not facing a door 305 when the orientation of the user is not in the direction from the user towards the door 305, i.e., when the user field of view U does not include the door 305 (see FIG. 4B).

Additionally, or alternatively, the vehicle computer 110 can classify a door 305 as monitored based on determining that the user is within a threshold distance of the door 305. Conversely, vehicle computer 110 can classify a door 305 as unmonitored based on determining that the user is not within the threshold distance of the door 305. The vehicle computer 110 can determine a distance D from the user to the door 305 (see FIGS. 4A-4B) based on sensor 115 data. As one example, a sensor 115, e.g., a radar sensor 115, mounted to the door 305 can measure an amount of time elapsed from emitting a radio wave to receiving the radio wave reflected from the user. Based on the time elapsed and a speed of light, the vehicle computer 110 can determine the distance D between the user and the door 305.

Alternatively, the vehicle computer 110 can determine a distance between the vehicle computer 110 and a user based on detecting the user device 165 associated with the user, e.g., based on detecting either the return of the respective transmitted RF signal or a response RF signal transmitted from the user device 165, e.g., continuously or in response to detecting the RF signal transmitted by the vehicle computer 110. In such an example, the vehicle computer 110 can determine a distance between the detected user device 165 and the vehicle computer 110 based on the detected RF signal. For example, the vehicle computer 110 can determine the distance by using a time-of-flight measurement. For example, the vehicle computer 110 can calculate the distance based on an amount of time between transmission of the RF signal and detecting the return of the transmitted RF signal. Other non-limiting examples of techniques to determine the distance include RSSI (Receiver Signal Strength Indication), AoA (Angle of Arrival), Phase of the RF message, etc. In this situation, the vehicle computer 110 can then, e.g., according to known geometric calculation techniques, determine the distance D based on the distance between the vehicle computer 110 and the user device 165 and the determined location of the door 305, e.g., in real-world coordinates, (as discussed above).

Upon determining the distance D between the user and the door 305, the vehicle computer 110 can compare the distance D to the threshold distance. If the distance D is greater than the threshold distance, then the vehicle computer 110 can classify the door 305 as unmonitored. If the distance D is less than or equal to the threshold distance, then the vehicle computer 110 can classify the door 305 as monitored. The threshold distance can be determined empirically, e.g., based on testing that allows for determining a minimum distance between a door 305 and the user indicating that the user is unlikely to return to a vehicle 105 within a predetermined time, e.g., 1 second, 5 seconds, etc. The threshold distance can be stored, e.g., in a memory of the vehicle computer 110.

Additionally, or alternatively, the vehicle computer 110 can classify each door 305 based on determining whether the user departed the passenger cabin 300 through the door 305. For example, the vehicle computer 110 can determine whether the user departed the passenger cabin 300 through a door 305 based on sensor 115 data. For example, the vehicle computer 110 can receive data from a door sensor 115 indicating that a door 305 is opened and then closed, as discussed above. In this situation, the vehicle computer 110 can classify the door 305 as monitored. As another example, the vehicle computer 110 can receive data from a door sensor 115 indicating that a door 305 remains closed. In this situation, the vehicle computer 110 can classify the door 305 as unmonitored.

Additionally, or alternatively, the vehicle computer 110 determine whether the user departed the passenger cabin 300 through a door 305 based on whether the door 305 is associated with the user. As set forth above, the vehicle computer 110 can associate a door 305 with the user, e.g., based on sensor 115 data. For example, if the door 305 is associated with the user, then the vehicle computer 110 can determine that the user departed the passenger cabin 300 via the door 305. In this situation, the vehicle computer 110 can classify the door 305 associated with the user as monitored. Conversely, if the door 305 is not associated with the user, then the vehicle computer 110 can determine that the user departed the passenger cabin 300 via another door 305. In this situation, the vehicle computer 110 can classify the door 305 as unmonitored.

The vehicle computer 110 can be programmed to activate first sensors 115a of external sensor assemblies 200a based on the classifications of the doors 305. The vehicle computer 110 can activate first sensors 115a having fields of view F that include an unmonitored door 305. The vehicle computer 110 can prevent activation of first sensors 115a having fields of view F that include a monitored door 305.

Additionally, or alternatively, the vehicle computer 110 can activate first sensors 115a of external sensor assemblies 200a based on an infrastructure sensor 150. For example, the infrastructure sensor 150 may have a field of view F that includes one or more doors 305 (see FIG. 5). That is, the infrastructure sensor 150 may be available to monitor one or more doors 305. The infrastructure element 145 may provide the field of view F to the vehicle computer 110, e.g., via the network 135. When an infrastructure sensor 150 has a field of view F including a door 305, the infrastructure element 145 may provide, to the vehicle computer 110, e.g., via the network 135, data including the door 305 obtained from the infrastructure sensor 150. If an infrastructure sensor 150 has a field of view F including a door 305, then the vehicle computer 110 can prevent activation of first sensors 115a having fields of view F that include the door 305, e.g., regardless of a classification of the door 305. If an infrastructure sensor 150 has a field of view F that does not include a door 305, then the vehicle computer 110 can activate first sensors 115a having fields of view F that include the door 305, e.g., when the door 305 is classified as unmonitored.

The vehicle computer 110 can be programmed to activate the first sensors 115a having fields of view F that include a monitored door 305 upon expiration of a timer. The vehicle computer 110 can initiate the timer upon determining that the user has departed the passenger cabin 300. A duration of the timer can be determining empirically, e.g., based on testing that allows for determining an average amount of time for various users to move more than the threshold distance away from the vehicle 105. Upon expiration of the timer, the vehicle computer 110 can re-classify the monitored door 305 as unmonitored and activate a first sensor 115a having a field of view F including the re-classified door 305.

Additionally, or alternatively, the vehicle computer 110 can be programmed to activate the first sensors 115a having fields of view F that include a monitored door 305 upon determining an updated pose for the user. For example, the vehicle computer 110 can determine an updated distance D between the user and the monitored door 305, e.g., in the same manner as discussed above regarding determining the distance D. The vehicle computer 110 can re-classify the monitored door 305 as unmonitored based on determining that the updated distance D is greater than the threshold distance, i.e., the user has moved away from the door 305. As another example, the vehicle computer 110 can determine an updated orientation for the user, e.g., in the same manner as discussed above regarding determining the orientation. The vehicle computer 110 can re-classify the monitored door 305 as unmonitored based on determining that user has moved to face away from the monitored door 305. The vehicle computer 110 can then activate a first sensor 115*a* having a field of view F including the re-classified door 305.

Preventing or delaying activation of first sensors 115*a* positioned to monitor doors 305 that are able to be monitored by a user and/or an infrastructure sensor 150 can provide an energy-efficient way to monitor the doors 305. Additionally, selectively activating the second sensor 115*b*, which is more energy-intensive than the first sensor 115*a*, in the minimal power state saves energy. The energy savings can be important when the vehicle 105 is in the minimal power state and relying on a finite supply of stored energy.

Figure 6:
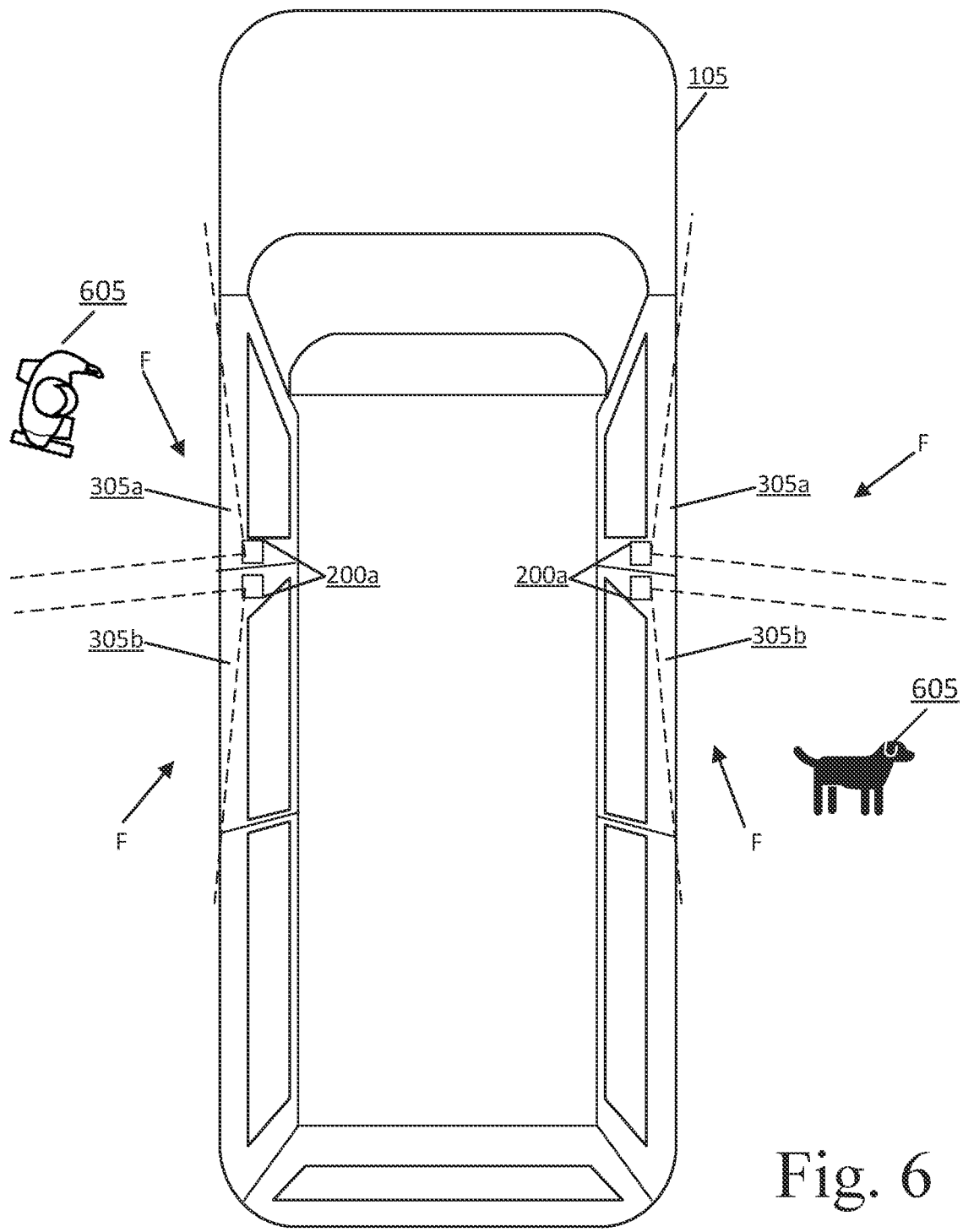
FIG. 6 is a diagram illustrating detecting exemplary objects approaching various doors of the vehicle.

After activating the first sensor 115*a*, the vehicle computer 110 then instructs the first sensor 115*a* to run at a scanning rate. The scanning rate may be determined empirically, e.g., based on testing that allows for determining a scanning rate that allows the first sensor 115*a* to detect an object 605 moving through the field of view F of the first sensor 115*a* while minimizing the power draw of the first sensor 115*a*. The vehicle computer 110 can detect objects 605 around the vehicle 105 based on data from the first sensor 115*a* (see FIG. 6). For example, the vehicle computer 110 can monitor data from the first sensor 115*a* to detect an object 605 has moved into the field of view F of the first sensor 115*a*, e.g., based on determining that radio waves in some direction indicate a shorter distance than previous radio waves in that direction.

Upon detecting an object 605 around the vehicle 105, the vehicle computer 110 can determine an object distance from the object 605 to the vehicle 105 based on the data from the first sensor 115*a* of the external sensor assembly 200*a*. For example, the first sensor 115*a* can measure an amount of time elapsed from emitting a radio wave to receiving the radio wave reflected from the object 605. Based on the time elapsed and a speed of light, the vehicle computer 110 can determine the object distance between the vehicle 105 and the object 605.

The vehicle computer 110 can then determine that the object 605 is within the threshold distance of a door 305 based on the object distance. For example, the vehicle computer 110 can compare the object distance to the threshold distance. If the object distance is greater than the threshold distance, then the vehicle computer 110 can ignore the object 605. If the object distance is less than or equal to the threshold distance, than the vehicle computer 110 activates the second sensor 115*b* of the external sensor assembly 200*a* facing the object 605. The vehicle computer 110 can then identify the detected object 605 based on data from the second sensor 115*b*. For example, the vehicle computer 110 can be programmed to classify and/or identify object(s) 605 based on data from the second sensor 115*b*. For example, object classification techniques, as discussed above, can be used to classify a detected object 605 as mobile, i.e., moveable, or stationary, i.e., non-movable. Additionally, or alternatively, object identification techniques, as discussed above, can be used to identify a type of the detected object 605, e.g., a user, an animal, a shopping cart, a pole, a wall, foliage, etc.

Upon determining that the object 605 is a type of object 605 other than a user, e.g., an animal, the vehicle computer 110 may be programmed to deactivate the second sensor 115*b* of the external sensor assembly 200*a*. For example, the vehicle computer 110 may initiate a second timer. The second timer may have a predetermined duration, e.g., 5 seconds, 30 seconds, 1 minute, etc. The predetermined duration may be stored, e.g., in a memory of the vehicle computer 110. If the vehicle computer 110 fails to detect another object 605 within the distance threshold via data from the second sensor 115*b* prior to expiration of the second timer, then the vehicle computer 110 can deactivate the second sensor 115*b*. If the vehicle computer 110 detects another object 605 within the distance threshold via data from the second sensor 115*b* prior to expiration of the second timer, then the vehicle computer 110 maintains the second sensor 115*b* as activated.

Upon identifying the type of object 605 as a user, the vehicle computer 110 determines whether the user is authorized or unauthorized. An authorized user has permission to access the passenger cabin 300. An unauthorized user lacks permission to access the passenger cabin 300. As one example, the vehicle computer 110 can determine whether the user is authorized or unauthorized based on the data from the second sensor 115*b*. For example, the vehicle computer 110 can perform facial recognition to determine whether the user's face is an authorized face, i.e., a face of a known authorized person, e.g., stored in a memory. The vehicle computer 110 can use any suitable facial-recognition technique, e.g., template matching; statistical techniques such as principal component analysis (PCA), discrete cosine transform, linear discriminant analysis, locality preserving projections, Gabor wavelet, independent component analysis, or kernel PCA; neural networks such as neural networks with Gabor filters, neural networks with Markov models, or fuzzy neural networks; etc. For another example, the vehicle computer 110 can perform gait recognition to determine whether the stride of the user is a recognized gait, i.e., a gait stored in memory of an authorized person.

As another example, the vehicle computer 110 can determine that the user is authorized based on authorizing a user device 165. Authorizing the user device 165 means the vehicle computer 110 determining that the user device 165 has permission to communicate with the vehicle computer 110; a failure to authorize occurs upon a determination that the user device 165 lacks permission to communicate with the vehicle computer 110. Upon detecting the user device 165, as discussed above, the vehicle computer 110 may be programmed to authorize the user device 165 based on a key, e.g., a combination of numbers and/or characters, received from the user device 165. For example, the vehicle computer 110 may authorize the user device 165 based on determining the received key matches an expected key, e.g., known to certain parties such as vehicle 105 distributors, e.g., dealers, stored in the memory of the vehicle computer 110. As another example, the authorized user device 165 can have an RFID device or the like uniquely specifying the user from among other potential users who regularly use the vehicle 105. The RFID signal can be associated with the user in memory, i.e., user data of the user includes the RFID signal. As another example, the authorized user device 165 can pair with, e.g., the HMI. The authorized user device 165 can be associated with the user in memory, i.e., user data of the user includes an identifier of the user device 165.

Upon determining that the user is authorized, the vehicle computer 110 may be programmed to deactivate the first and/or second sensors 115 in at least some of the external sensor assemblies 200a. Specifically, the vehicle computer 110 can re-classify one or more unmonitored doors 305 as monitored based on the user. For example, the vehicle computer 110 can re-classify the door 305 associated with the user. Additionally, or alternatively, the vehicle computer 110 can re-classify doors 305 within a user field of view U, e.g., based on a pose of the user.

Upon re-classifying the doors 305, the vehicle computer 110 can deactivate sensors 115 positioned to monitor the re-classified doors. That is, the vehicle computer 110 can stop monitoring doors 305 through which the user is expected to enter the passenger cabin 300 and/or within the user field of view U. Deactivating the sensors 115 in at least some of the external sensor assemblies 200a can save energy while the user is approaching the vehicle 105.

Upon determining that the user is unauthorized, the vehicle computer 110 may be programmed to actuate vehicle components 125 to output an audio and/or visual alert indicating an unauthorized user is approaching the vehicle 105. In this situation, the vehicle computer 110 can actuate one or more vehicle components 125, e.g., speakers, a display, a horn, exterior lights, etc., to output the alert. Additionally, or alternatively, the vehicle computer 110 may provide a message, e.g., via the network 135, to the remote server computer 140 or the user device 165 indicating an unauthorized user is approaching the vehicle 105.

Figure 7:
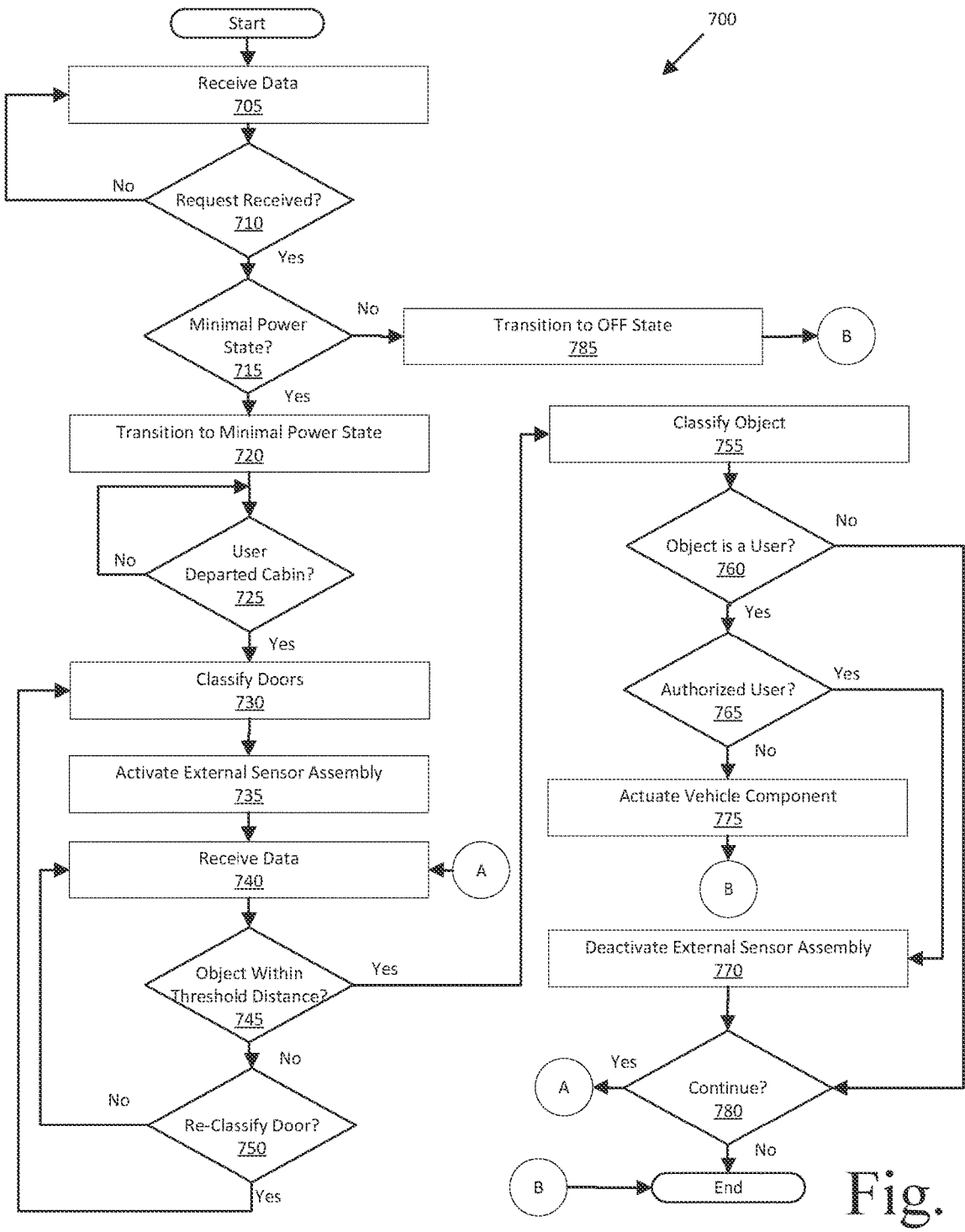
FIG. 7 is a flowchart of an example process for monitoring vehicle doors.

FIG. 7 is a flowchart of an example process 700 executed in a vehicle computer 110 according to program instructions stored in a memory thereof for optimizing sensor 115 monitoring of vehicle doors 305. Process 700 includes multiple blocks that can be executed in the illustrated order. Process 700 could alternatively or additionally include fewer blocks or can include the blocks executed in different orders.

Process 700 begins in a block 705. In the block 705, the vehicle computer 110 receives data from one or more sensors 115 indicating that a user is in a passenger cabin 300 of the vehicle 105. The vehicle computer 110 can associate a door 305 with a user of the vehicle 105 based on the sensor 115 data, as discussed above. The process 700 continues in a block 710.

In the block 710, the vehicle computer 110 determines whether a request to transition the vehicle 105 from an ON state is received. If the request is received, then the process 700 continues in a block 715. Otherwise, the process 700 returns to the block 705.

In the block 715, the vehicle computer 110 determines whether to transition the vehicle 105 to the minimal power state. Upon receiving a request, the vehicle computer 110 determines to transition the vehicle to the minimal power state, e.g., based on a time of day and/or a location of the vehicle 105, as discussed above. If the vehicle computer 110 determines to transition the vehicle 105 to the minimal power state, then the process 700 continues in a block 715. Otherwise, the process 700 continues in a block 785.

In the block 720, the vehicle computer 110 transitions the vehicle 105 to the minimal power state. The process 700 continues in a block 725.

In the block 725, the vehicle computer 110 determines whether the user has departed the passenger cabin 300. The vehicle computer 110 can determine that the user has departed the passenger cabin 300 based on data from one or more sensors 115, as discussed above. Additionally, or alternatively, the vehicle computer 110 can determine that the user has departed the passenger cabin 300 based on location data from a user device 165 associated with the user, as discussed above. If the vehicle computer 110 determines that the user has departed the passenger cabin 300, then the process 700 continues in a block 730. Otherwise, the process 700 remains in the block 725.

In the block 730, based on a pose of the user, the vehicle computer 110 classifies each of the vehicle 105 doors 305 as one of monitored or unmonitored. The vehicle computer 110 can determine the pose of the user based on data received from one or more sensors 115 and/or from the user device 165, as discussed above. Additionally, or alternatively, the vehicle computer 110 can classify each door 305 based on determining whether the user departed the passenger cabin 300 through the door 305, as discussed above. Additionally, or alternatively, the vehicle computer 110 can classify each door 305 based on whether the door 305 is associated with the user, as discussed above. The process 700 continues in a block 735.

In the block 735, the vehicle computer 110 activates first sensors 115a of external sensor assemblies 200b that are positioned to face unmonitored doors 305, as discussed above. The process 700 continues in a block 740.

In the block 740, the vehicle computer 110 receives data from the activated first sensors 115a. The data can include an object 605 around the vehicle 105, as discussed above. The process 700 continues in a block 745.

In the block 745, the vehicle computer 110 determines whether an object 605 is within the threshold distance of a door 305. The vehicle computer 110 can detect the object 605 based on the data obtained from the first sensors 115a in the block 730, as discussed above. The vehicle computer 110 can then determine an object distance from the object 605 to the door 305 based on the data obtained from the first sensors 115a in the block 740, as discussed above. The vehicle computer 110 compares the object distance to the threshold distance. If the object distance is less than the threshold distance, then the process 700 continues in a block 755. Otherwise, the process 700 continues in a block 750.

In the block 750, the vehicle computer 110 determines whether to re-classify one or more monitored doors 305. The vehicle computer 110 can determine to re-classify a monitored door 305 upon expiration of a first timer, as discussed above. Additionally, or alternatively, the vehicle computer 110 can determine to re-classify a monitored door 305 based on determining an updated pose for the user, as discussed above. If the vehicle computer 110 determines to re-classify a monitored door 305, then the process 700 returns to the block 730. Otherwise, the process 700 returns to the block 740.

In the block 755, the vehicle computer 110 classifies the detected object 605. The vehicle computer 110 activates a second sensor 115b of the external sensor assembly 200b facing the object 605, as discussed above. The vehicle computer 110 then obtains data from the second sensor 115b and identifies the detected object 605 based on the data from the second sensor 115b, as discussed above. The vehicle computer 110 can classify the object based on a type of the object, as discussed above. The process 700 continues in a block 760.

In the block 760, the vehicle computer 110 determines whether the object 605 is a user. If the vehicle computer 110 classifies the object 605 as a user, then the process 700 continues in a block 765. Otherwise, the process 700 continues in a block 780.

In the block 765, the vehicle computer 110 determines whether the user is authorized or unauthorized, as discussed above. If the vehicle computer 110 determines that the user is authorized, then the process 700 continues in a block 770. Otherwise, the process 700 continues in a block 775.

In the block 770, the vehicle computer 110 deactivates the sensors 115 positioned to face, i.e., having a field of view F including, re-classified doors 305. The vehicle computer 110 can re-classify doors 305 associated with the user and/or within a user field of view U, as discussed above. The process 700 continues in the block 780.

In the block 775, the vehicle computer 110 actuates one or more vehicle components 125 to output an alert indicating that an unauthorized user is approaching the vehicle 105, as discussed above. Additionally, or alternatively, the vehicle computer 110 can provide a message, e.g., to a remote server computer 140 and/or a user device 165, indicating that an unauthorized user is approaching the vehicle 105, as discussed above. The process 700 ends following the block 775.

In the block 780, the vehicle computer 110 determines whether to continue the process 700. For example, the vehicle computer 110 can determine not to continue upon receiving a request to transition the vehicle 105 to one of the OFF state or the ON state. Conversely, the vehicle computer 110 can determine to continue based on not receiving the request to transition the vehicle 105 to one of the OFF state or the ON state. If the vehicle computer 110 determines to continue, then the process 700 returns to the block 740. If the vehicle computer 110 determines not to continue, then the vehicle computer 110 transitions the vehicle 105 to the requested state, and the process 700 ends following the block 780.

In the block 785, the vehicle computer 110 transitions the vehicle 105 to the OFF state. The process 700 ends following the block 785.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor programmed to:
    transition a vehicle from an ON state to a minimal power state based on receiving a request, wherein an internal sensor monitors a passenger cabin and an external sensor is selectively activated upon transitioning to the minimal power state;
    upon detecting a user departing the passenger cabin of the vehicle via data from the internal sensor, determine a pose of the user based on data from at least one of the internal sensor and the external sensor;
    determine a field of view and a distance from a vehicle door of a user based on data from at least one of the internal sensor and the external sensor;
    determine a classification for the vehicle door based on the pose, wherein the classification is monitored when the door is within the field of view of the user and within a distance threshold of the user, and otherwise is unmonitored; and
    activate the external sensor to monitor the vehicle door based on the classification being unmonitored;
    wherein the internal sensor is disposed within the passenger cabin and has a field of view including the passenger cabin, and the external sensor is disposed outside of the passenger cabin and has a field of view including the vehicle door.

2. The system of claim 1, wherein the instructions further include instructions to classify the vehicle door as unmonitored based additionally on determining the user departed the passenger cabin through another vehicle door.

3. The system of claim 1, wherein the instructions further include instructions to classify the vehicle door as unmonitored based on determining the user is facing in a direction away from the vehicle door.

4. The system of claim 1, wherein the instructions further include instructions to classify the vehicle door as monitored based on determining a distance from the user to the vehicle door is less than or equal to a threshold distance.

5. The system of claim 4, wherein the instructions further include instructions to prevent activation of the external sensor based on the distance remaining less than or equal to the threshold distance.

6. The system of claim 4, wherein the instructions further include instructions to activate the external sensor based on the distance increasing above the threshold distance.

7. The system of claim 6, wherein the instructions further include instructions to deactivate the external sensor based on the distance decreasing to or below the threshold distance.

8. The system of claim 1, wherein the instructions further include instructions to, upon classifying the vehicle door as monitored, prevent activation of the external sensor prior to expiration of a timer.

9. The system of claim 8, wherein the instructions further include instructions to initiate the timer upon detecting the user departing from the passenger cabin.

10. The system of claim 8, wherein the instructions further include instructions to activate the external sensor upon expiration of the timer.

11. The system of claim 1, wherein the instructions further include instructions to classify the vehicle door as monitored based additionally on determining the user departed the passenger cabin through the vehicle door.

12. The system of claim 1, wherein the instructions further include instructions to classify the vehicle door as monitored based on determining the user is facing in a direction towards the vehicle door.

13. The system of claim 1, wherein the instructions further include instructions to control the external sensor to monitor the vehicle door based additionally on a field of view of an infrastructure sensor.

14. The system of claim 13, wherein the instructions further include instructions to prevent activation of the external sensor upon determining that the vehicle door is within the field of view of the infrastructure sensor.

15. The system of claim 13, wherein the instructions further include instructions to activate the external sensor upon determining that the vehicle door is outside of the field of view of the infrastructure sensor and is classified as unmonitored.

16. The system of claim 1, wherein the instructions further include instructions to control the external sensor to monitor the vehicle door based additionally on a location of the vehicle.

17. The system of claim 1, wherein the instructions further include instructions to control the external sensor to monitor the vehicle door based additionally on a time of day.

18. A method, comprising:
    transitioning a vehicle from an ON state to a minimal power state based on receiving a request, wherein an internal sensor monitors a passenger cabin and an external sensor is selectively activated upon transitioning to the minimal power state;
    upon detecting a user departing the passenger cabin of the vehicle via data from the internal sensor, determining a pose of the user based on data from at least one of the internal sensor and the external sensor;
    determining a field of view and a distance from a vehicle door of a user based on data from at least one of the internal sensor and the external sensor;
    determining a classification for the vehicle door based on the pose, wherein the classification is monitored when the door is within the field of view of the user and within a distance threshold of the user, and otherwise is unmonitored; and activating the external sensor to monitor the vehicle door based on the classification being unmonitored;

wherein the internal sensor is disposed within the passenger cabin and has a field of view including the passenger cabin, and the external sensor is disposed outside of the passenger cabin and has a field of view including the vehicle door.

19. The method of claim 18, further comprising controlling the external sensor to monitor the vehicle door based additionally on at least one of a location of the vehicle or a time of day.

* * * * *